H. SAURER.
VALVE GEAR FOR DESCENDING AUTOMOBILES.
APPLICATION FILED AUG. 28, 1905.

934,762.

Patented Sept. 21, 1909.
2 SHEETS—SHEET 1.

H. SAURER.
VALVE GEAR FOR DESCENDING AUTOMOBILES.
APPLICATION FILED AUG. 28, 1905.
934,762.
Patented Sept. 21, 1909.
2 SHEETS—SHEET 2.
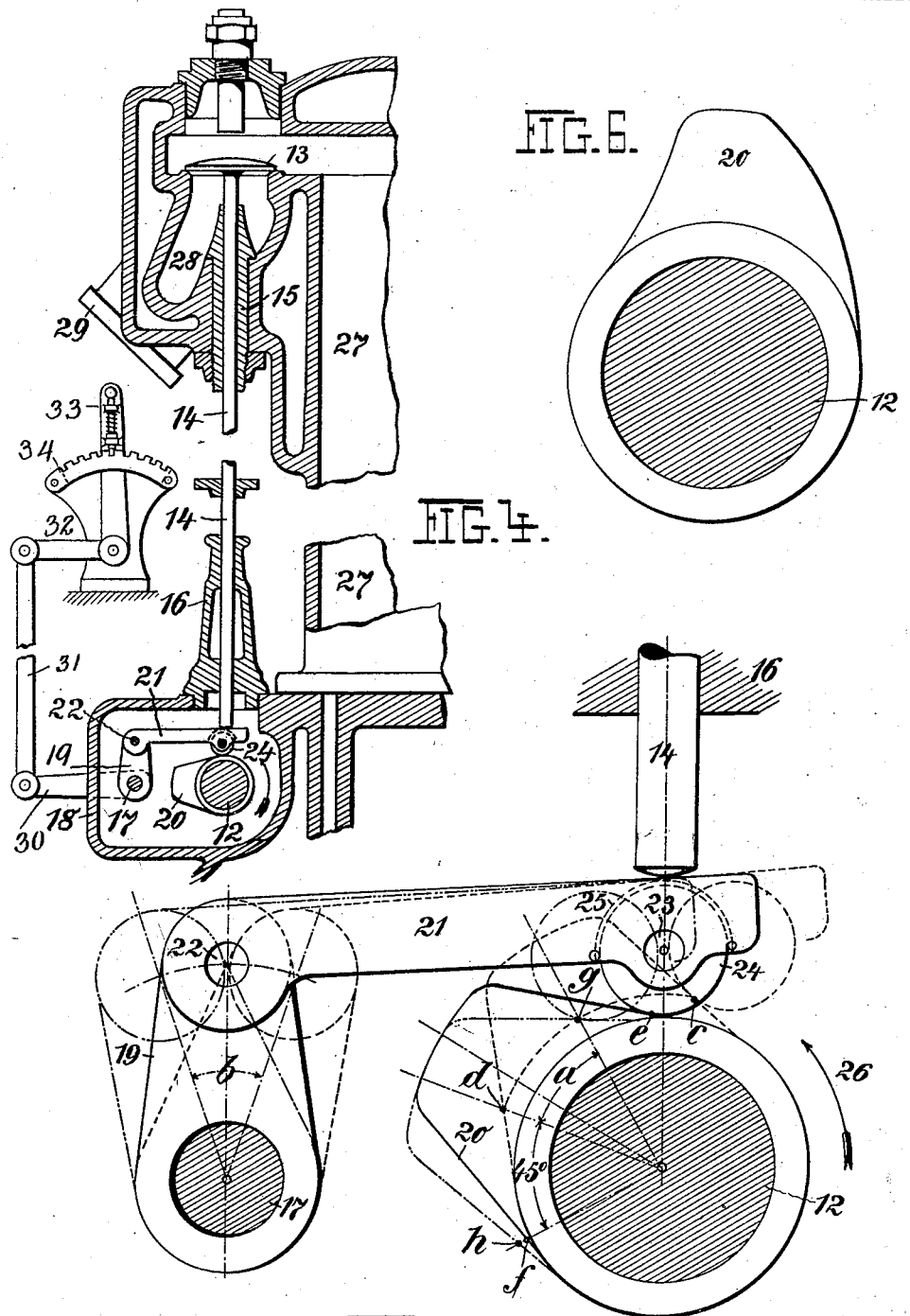

UNITED STATES PATENT OFFICE.

HIPPOLYT SAURER, OF ARBON, SWITZERLAND.

VALVE-GEAR FOR DESCENDING AUTOMOBILES.

934,762.

Specification of Letters Patent.   Patented Sept. 21, 1909.

Application filed August 25, 1905.   Serial No. 276,183.

*To all whom it may concern:*

Be it known that I, HIPPOLYT SAURER, a citizen of the Confederation of Switzerland, residing at Arbon, in Switzerland, have invented a new and useful Valve-Gear for Descending Automobiles, of which the following is a specification.

In my application of November 22, 1904, for a U. S. patent, Serial No. 233870, I have described a method of regulating descending automobiles and a valve gear therefor. This method of regulating the speed of an automobile having a four stroke cycle explosion motor during long descents consists in stopping the supply of the driving medium and the igniting device, allowing the inlet valve or valves to work as usual, and so changing the outlet cam or cams on the cam shaft as to cause the outlet valve or valves to open and admit air during the whole or a part of the respective third piston strokes, so that the air is compressed during the second piston strokes and during the whole or a part of the fourth piston strokes for retarding the vehicle.

My invention relates to another valve gear for obtaining a similar result without changing the outlet cam or cams on the cam shaft.

I will now proceed to describe my invention with reference to the accompanying drawings, in which—

Figure 1:
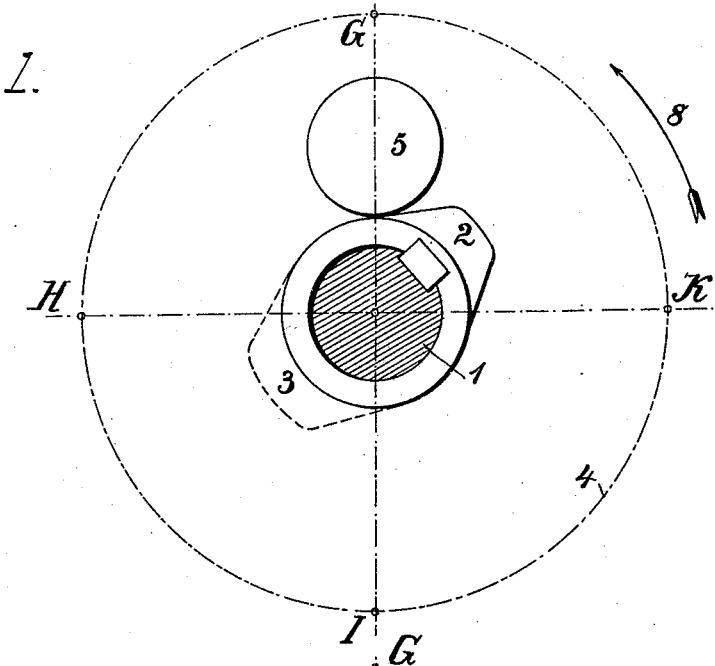
Figure 2:
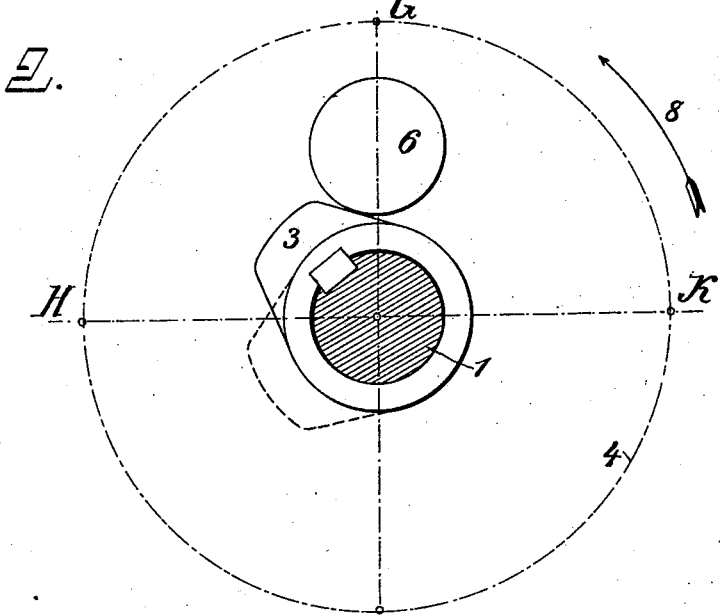
Figure 3:
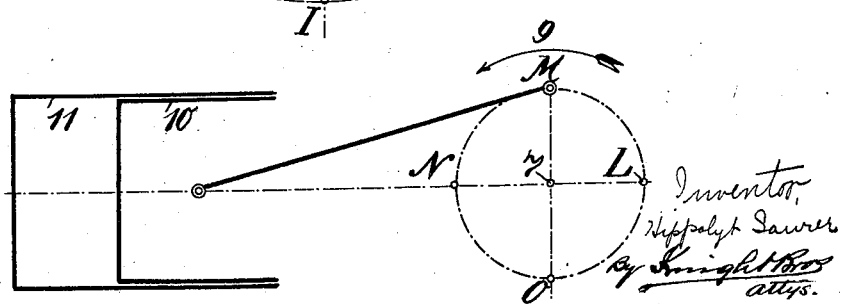

Figures 1 to 3 are diagrams, which will be referred to later on, Fig. 4 is a longitudinal section through a part of a cylinder, its outlet valve box, the cam shaft and the controlling shaft, an intermediate part being omitted and the outlet valve with its rod, the roller with its rod and lever being shown in elevation, Fig. 5 is a part out of Fig. 4 on an enlarged scale and shows different positions of the outlet cam, the roller, the rod and the lever on the controlling shaft, and Fig. 6 shows a modified outlet cam on the cam shaft.

Similar characters of reference refer to similar parts throughout the several views.

Figs. 1 to 3 are reproduced from the above mentioned application and illustrate the manner, in which the speed of the descending automobile may be regulated by changing each outlet cam on the cam shaft. Fig. 1 represents for example a cross section through an ordinary cam shaft 1 of a four stroke cycle explosion motor immediately before the inlet cam 2, while Fig. 2 is a cross section through the same cam shaft 1 immediately before the outlet cam 3, the cam shaft 1 occupying the same position in both Figs. 1 and 2. The cam shaft 1 is driven from the crank shaft 7 in Fig. 3 at the rate of 2:1 as usual, that is to say, it makes but one revolution on every two revolutions of the crank shaft 7, the gear wheel or bevel wheel being indicated by the dotted circle 4. The two cams 2 and 3 are assumed to act upon the inlet valve and the outlet valve respectively by means of two rollers 5 and 6. In general the two cams 2 and 3 are different in size or shape. In Figs. 1 and 2 the cam shaft 1 is assumed to turn in the direction of the arrow 8 and in Fig. 3 the crank shaft 7 in the same direction, *i. e.* that of the arrow 9, but it will be understood, that these directions of revolution may be different according to the circumstances. When a point on the gear wheel 4 moves from G through an angle of 90° to H, then the crank pin will move in the same time through an angle of 180°, for example from N through O to L. The two cams 2 and 3 are normally so disposed, that during the revolution of the said point on the gear wheel 4 from G to H the inlet cam 2 will lift the roller 5 and thereby open the inlet valve and that during the revolution of the same point from K to G the outlet cam 3 will lift the roller 6 and thereby open the outlet valve. In other words, the inlet valve will be opened during the first quarter of a revolution of the cam shaft 1 and during the first stroke of the piston 10 in the cylinder 11 or during the first path of the crank pin from N through O to L, and the outlet valve will be opened during the fourth quarter of a revolution of the cam shaft 1 and during the fourth piston stroke or during the second path of the crank pin from L through M to N. When the automobile is descending on a steep road, both the supply of the gas or other driving medium and the igniting device are stopped and according to the application mentioned above the outlet cam 3 is so turned in the direction of the arrow 8 through an angle of about 80° or 90° as to bring it into the position indicated by the dotted lines in Fig. 2. Then air will be admitted by the inlet valve with the aid of the inlet cam 2 and the roller 5 during the first quarter of a revolution of the cam shaft 1 or during the first piston stroke or during the first path of the crank pin from N through O to L. Afterward air will also be admitted by the outlet valve with the aid of the outlet cam 3 and the roller 6 during the third quarter of a revolution of the cam shaft 1 (the said point on the gear wheel 4 describing the path from I to K) or during the third piston stroke or during the second path of the crank pin from N through O to L. The consequence will be, that the air is compressed not only during the second piston stroke, but also during the fourth piston stroke, i. e. once during each revolution of the crank shaft 7, so that the pressure of the compressed air acting upon the crank pin will retard the vehicle and prevent it from running fast. In case the road is not very steep, of course the outlet cam 3 need not be changed through the entire angle from the position shown by the full lines in Fig. 2 to the other position indicated by the dotted lines. Then air will be admitted during the first piston stroke and during a part of the third piston stroke and compressed during the second piston stroke and during a part of the fourth piston stroke, so that the pressure of the compressed air is larger at the end of the second piston stroke than at the end of the fourth piston stroke. By varying the angle, through which the outlet cam 3 is turned from its normal position shown by the full lines at Fig. 2 the speed of the descending vehicle can be regulated. For attaining this object according to the application mentioned above the inlet cams were arranged on a special cam shaft and the outlet cams on another cam shaft, which latter can be displaced with regard to the first cam shaft by means of a special mechanism.

According to my present invention a single cam shaft 12, Figs. 4 and 5, is employed, on which both the inlet and the outlet cams are fastened. As the inlet valves are working in the usual manner, they are left out of consideration, while an outlet valve 13 is shown in Fig. 4. Its spindle 14 is mounted in suitable guides 15 and 16 of any known construction to move longitudinally. The cam shaft 12 is driven from the crank shaft (not shown) in any known manner at the rate of 2:1 as usual and stated above. Parallel with the cam shaft 12 a controlling shaft 17 is mounted in suitable bearings (not shown) to turn. It is to be connected in any known manner with a controlling handle 33 within the reach of the driver, for example by means of a lever 30, a rod 31 and an arm 32. Then the driver will be enabled to turn from his seat the controlling shaft 17 through a convenient angle b (see Fig. 5) and to adjust it in any position by means of a notched bow 34, into either notch of which a spring-pressed finger on the controlling handle 33 can engage. According to the number of the cylinders of the motor a corresponding number of inlet cams and of outlet cams are fastened on the cam shaft 12 at certain angles from each other as usual. In Fig. 4 the several inlet and outlet cams and part of the cam shaft 12 may be assumed to be inclosed in a casing 18, but of course this is quite immaterial. On the controlling shaft 17 as many levers 19 are secured in the same plane passing through the axis of the shaft, as there are outlet cams on the cam shaft 12. For the sake of clearness only one outlet cam 20 is shown as fastened on the cam shaft 12. A horizontal rod 21 is pivotally connected with the lever 19 by means of a pin 22 and carries near its other end a pin 23, on which a roller 24 is mounted to turn. This roller 24 may be assumed to engage in a recess 25 of the rod 21, but this construction is quite immaterial. The lower end of the valve spindle 14 is adapted to ride upon the rod 21, which can be moved horizontally by means of the lever 19 in the manner described above. In general the lower end of the valve spindle 14 is not always in contact with the rod 21, but only during the time, when it is being lifted by the outlet cam 20. When the parts 19, 21 and 24 occupy the middle position shown by the full lines, there will be a little clearance left between the rod 21 and the valve spindle 14 during the time in which the roller 24 runs on the concentric part of the smallest radius of the cam 20, since the outlet valve 13 is supported by its seat. In case the parts 19, 21 and 24 occupy either the right or the left extreme position indicated by the dotted lines, of course there will be a greater clearance between the rod 21 and the valve spindle 14 during the time in which the roller 24 runs on the said concentric part of the smallest radius of the cam 20, as will be clear from an examination of Fig. 5. For making a comparison between Figs. 1 to 3 and Fig. 5, the cam shaft 12 is assumed to run in the same direction as in Figs. 1 and 2, i. e. in the direction of the arrow 26. In Fig. 5 the outlet cam 20 is shown in three different positions, in which it ceases to lift the outlet valve 13, so that the latter closes and the rod 21 will leave the valve spindle 14 on the cam shaft 12 turning further. The position of the outlet cam 20 shown by the full lines corresponds with the middle position of the parts 19, 21 and 24. The two other positions of the outlet cam 20 indicated by the differently dotted lines correspond with the two extreme positions of the parts 19, 21 and 24 indicated by the similarly dotted lines. The angle $a$ formed by the two extreme positions shown of the outlet cam 20 happens to be 40° 10', but it may be varied at pleasure by proportioning the amplitude of the angle $b$, the length of the lever 19 and the rod 21, the diameter of the roller 24, the size and shape of the outlet cam 20 and the relative position of the cam shaft 12 and the controlling shaft 17. Fig. 6 shows for example a modification of the outlet cam 20.

The valve gear described operates as follows: Normally the controlling handle near the driver's seat is so adjusted as to bring all the levers 19 on the controlling shaft 17 into the extreme left position indicated by the dotted lines in Fig. 5. In this position all the levers 19 are left, as long as the automobile stops or runs either on horizontal roads or uphill on inclined roads. The motor is started and stopped in the usual manner with the aid of the respective known devices. From an examination of Fig. 5 it will be evident, that during the work of the motor the outlet cam 20 for either cylinder 27 will lift the roller 24 with the rod 21 and the valve spindle 14 during the fourth piston stroke to open the outlet valve 13, so that the products of the explosion are allowed to escape from the cylinder 27 past the outlet valve 13 through the tube 28 and any tube (not shown) adjoining to the flange 29 into the atmosphere. When a circle concentric with the cam shaft 12 is drawn through the point of contact $c$ between the cam 20 and the roller 24, it will be found, that in this circle $c-d$ the cam 20 of the shape shown covers an angle of nearly 90°. When the vehicle descends and its speed requires to be regulated with the aid of compressed air, the supply of the driving medium is stopped and the igniting device rendered inactive, while the controlling lever near the driver's seat is turned through a convenient angle determined by experience or trials in accordance with the angle of inclination of the road and then secured in its new position. Thereby the parts 19, 21 and 24 may be assumed to be brought for example into the middle position shown by the full lines in Fig. 5. On drawing a circle (not shown) concentric with the cam shaft 12 and through the new point of contact $e$, it will be found, that the point of intersection $f$ of this circle with the other side of the cam 20, that is the point of contact, in which the cam 20 commences to lift the roller 24, is distant from the previous point of contact $d$ by an angle of about 45°. When assuming the outlet cam 20 to normally commence to lift the outlet valve at K in Figs. 1 and 2, this would mean, that now the outlet cam 20 would commence to lift the outlet valve 13 at a point between I and K, which is distant from K by an angle of 45°. In other words, the outlet cam 20 would commence to open the outlet valve 13 at the middle of the third piston stroke and close the valve at a certain point near the end of the fourth piston stroke (the point of contact $e$ being at an angle of about 15° from the previous point of contact $c$). Or if the parts 19, 21 and 24 are brought into the extreme right position indicated by the dotted lines, it will be found from Fig. 5, that the new point of contact $h$ is at an angle of about 45° from the initial point of contact $d$ and the other new point of contact $g$ is at an angle of about 42° from the previous point of contact $c$. This means, that the outlet cam 20 will commence to open the outlet valve 13 at the middle of the third piston stroke and close it after the piston has traveled through more than half its fourth stroke. Then air will be fully compressed during the second piston stroke and partially during the fourth piston stoke, whereby of course the vehicle is retarded and prevented from running fast.

It is true, that the valve gear as illustrated in the drawings is not capable of attaining the maximal effect as described in my said application, viz. the admission of air during the whole third piston stroke and the compression of the air during the whole fourth piston stroke, but in many cases the new valve gear will be found to answer the purpose.

The valve gear described may be varied in many respects without deviating from the spirit of my invention.

What I claim as my invention, and desire to secure by Letters Patent, is—

1. In a four stroke cycle explosion motor for automobiles, means to retard the speed of the motor when the automobile is running by momentum or gravity and the supply of the explosive medium is stopped, the said means comprising a shifting device with a roller interposed between the stem of the outlet valve and the cam for actuating the same and the roller being adapted to roll on the cam, and means under the control of the driver for varying the position of said shifting device.

2. In a four stroke cycle explosion motor for automobiles, the combination with a cylinder and its outlet valve and valve-stem, of a shaft provided with a cam for actuating said valve, a bar carrying a roller intermediate of said cam and stem, and means under the control of the driver for adjusting by said bar the position of said roller which is adapted to roll on said cam, whereby this cam may be caused to open said valve to admit air during the third stroke of the piston in the cycle, so that the air can be compressed during the fourth piston stroke for retarding the motor when the automobile is running by momentum or gravity and the supply of the explosive medium is stopped.

3. In a four stroke cycle explosion motor for automobiles, the combination with the outlet valves and their stems, of a shaft provided with cams for actuating said valves, bars with rollers interposed between said cams and said stems and the rollers being adapted to roll on the cams, and a rocking shaft under the control of the driver and carrying arms which are pivotally connected with said bars, whereby said rollers may be shifted to cause said outlet valves to be opened for admitting air during the third stroke of the pistons in the cycle, so that the air can be compressed during the fourth piston stroke for retarding the motor when the automobile is running by momentum or gravity and the supply of the explosive medium is stopped.

4. In a four stroke cycle explosion motor for automobiles, the combination with a cylinder, its outlet valve and valve stem, of a shaft provided with a cam, mechanism interposed between the shaft and the valve stem and acted on by the cam to normally open the outlet valve during the fourth stroke of the cycle for the outlet of spent gases, and manually operable means for shifting said mechanism to cause it to open the outlet valve for admitting air during the third stroke in the cycle, so that the air can be compressed during the fourth stroke of the cycle to retard the speed of the motor, when the automobile is running by momentum or gravity and the supply of the explosive medium is stopped.

5. In a four cycle explosion motor for automobiles, the combination with a cylinder, its outlet valve and vertical valve stem, of a shaft provided with a cam and adapted to be rotated two revolutions to one of the engine crank shaft, a controlling shaft adjacent to and parallel with the cam shaft, a lever fixed to said controlling shaft, a horizontally movable bar pivotally connected to said lever and disposed intermediate the cam and the lower end of the valve stem, said arm adapted to raise the valve stem when acted on by said cam, a roller mounted in said bar and adapted to roll on the cam while it is in the central line of said valve stem for its middle position, and on one or the other side of the central line for its one or other extreme position respectively, and manually operable means for turning said controlling shaft in either direction through a certain angle and adjusting it.

6. In a four cycle explosion motor for automobiles, the combination with a cylinder and its outlet valve and valve stem, of a shaft provided with a cam, a controlling shaft adjacent to and parallel with said cam shaft, a lever fixed to said controlling shaft and disposed upright thereto, a horizontal bar pivotally connected to said lever and disposed intermediate said cam and the lower end of the valve stem, said bar adapted to lift the valve stem when acted on by the cam of the cam shaft, a roller carried by said arm and adapted to roll on said cam, said controlling shaft adapted to turn whereby to laterally adjust the horizontal arm, a second lever on said controlling shaft, and means for manually operating said second lever whereby to operate the controlling shaft.

In testimony whereof I have signed my name to this specification in the presence of two subscribing witnesses.

HIPPOLYT SAURER.

Witnesses:
C. A. BUSS,
HERNANDO DE SOTO.